United States Patent [19]

Jenkins et al.

[11] 4,177,515

[45] Dec. 4, 1979

[54] INTERRUPT ADAPTER FOR DATA PROCESSING SYSTEMS

[75] Inventors: Alfred D. Jenkins; Edward W. Schade, Jr., both of Cambridge, Ohio

[73] Assignee: NCR Corporation, Dayton, Ohio

[21] Appl. No.: 864,044

[22] Filed: Dec. 23, 1977

[51] Int. Cl.² ............................................. G06F 9/18
[52] U.S. Cl. ................................................. 364/200
[58] Field of Search ............ 235/92 ST; 364/900 MC, 364/200 MC, 200 MS File, 900 MS File

[56] References Cited

U.S. PATENT DOCUMENTS

| | | | |
|---|---|---|---|
| 3,245,045 | 4/1966 | Randlev | 364/200 |
| 3,254,038 | 5/1966 | Stafford . | |
| 3,289,168 | 11/1966 | Walton | 364/200 |
| 3,754,120 | 8/1973 | Fitzgerald | 235/92 ST |
| 3,772,656 | 11/1973 | Serracchioli | 364/200 |
| 3,876,868 | 4/1975 | Cramwinckel | 235/92 ST |
| 4,039,757 | 8/1977 | Frisone | 179/15 AL |

Primary Examiner—Gareth D. Shaw
Assistant Examiner—E. Chan
Attorney, Agent, or Firm—J. T. Cavender; Wilbert Hawk, Jr.; Richard W. Lavin

[57] ABSTRACT

An adapter for use with a host processor for processing interrupts between a host processor and a plurality of remote data terminal devices is disclosed. The adapter includes a microprocessor, counter means which is incremented by a clock for sequentially interrogating a plurality of remote data terminal devices to determine whether or not a remote device is requesting access to the host processor and an external buffer for storing the output of the counter. The output of the counter is transferred to the microprocessor upon the sensing of a request signal for use by the microprocessor in identifying the requesting remote data terminal device and for processing the data from the requesting device to the host processor. The operation of the counter means is controlled by the microprocessor in accordance with the availability of the microprocessor to service the requesting data terminal device.

5 Claims, 7 Drawing Figures

INTERRUPT ADAPTER FOR DATA PROCESSING SYSTEMS

BACKGROUND OF THE INVENTION

The present invention is directed to a data processing system in which a plurality of mutually asynchronous data handling devices are in communication with a host processor for processing data transmitted over a common bus system and more particularly to a communication adapter for processing interrupt messages from a plurality of remote terminal devices independently of the operation of the host processor.

Present data processing systems have included a central or host processor and a plurality of data handling peripheral units which are connected to the host processor for the purpose of exchanging information with the host processor. Since each of the peripheral units operates independently of each other, conflicts can arise between a plurality of peripheral units trying to gain access to the host processor at the same time. Where the host processor has unlimited processing capability to handle all the requests generated by the peripheral units, this condition presents very few problems. But when for various cost-related reasons, the host processor has limited memory capacity, storage facilities, communicaton ports, etc., it is necessary to provide other means to allow the host processor to effectively function in this environment without limiting its operation.

The most common solution to this problem is to insert a communication adapter between the host processor and the peripheral devices allowing the adapter to handle all communication requests from a plurality of assigned peripheral devices with the host processor communicating only with the adapters. An example of this type of system is disclosed in U.S. Pat. No. 3,254,038 issued to Stafford in which the central processor polls each of the adapters to determine if they contain any messages from their assigned peripheral devices. The drawback of this system is in the cost of the adapters and the fact that the central processor is required to poll each of the adapters thereby requiring a considerable amount of software in the central processor's program to provide a polling sequence which is quite costly and time consuming. In U.S. Pat. No. 4,039,757 issued to Frisone, the adapter is constructed to connect a plurality of remote devices directly to the central processor in response to the polling of the adapter by the central processor. Again, the processor is required to provide the software support polling program with respect to the adapters which slows down the processing operation.

Accordingly, it is an object of the present invention to provide a low-cost adapter for processing interrupt messages between a plurality of remote peripheral devices and a host processor without requiring the host processor to generate a polling sequence operation with respect to the remote peripheral devices. It is another object of this invention to provide an adapter for processing interrupt messages from a plurality of remote peripheral devices which is hardware orientated rather than software orientated. It is another object of this invention to provide an adapter with a microprocessor which communicates with a requesting remote peripheral device without going through a polling sequence.

SUMMARY OF THE INVENTION

In order to fulfill these objects, there is provided an adapter which includes a microprocessor for reading and storing data received from a remote peripheral device, counter means for sequentially outputting the address of each of the remote peripheral devices, external storing means for storing the output of the counter means and logic means responsive to the generation of the output of the counter means for identifying a requesting peripheral device which has an interrupt message for the host processor, for generating an interrupt signal to the microprocessor and for releasing the stored output to the microprocessor for initiating a read operation and for identifying the requesting peripheral device by the microprocessor.

BRIEF DESCRIPTION OF THE DRAWINGS

Additional advantages and features of the present invention will become apparent and fully understood from a reading of the following description taken together with the annexed drawings.

DESCRIPTION OF THE PREFERRED EMBODIMENT

Figure 1:
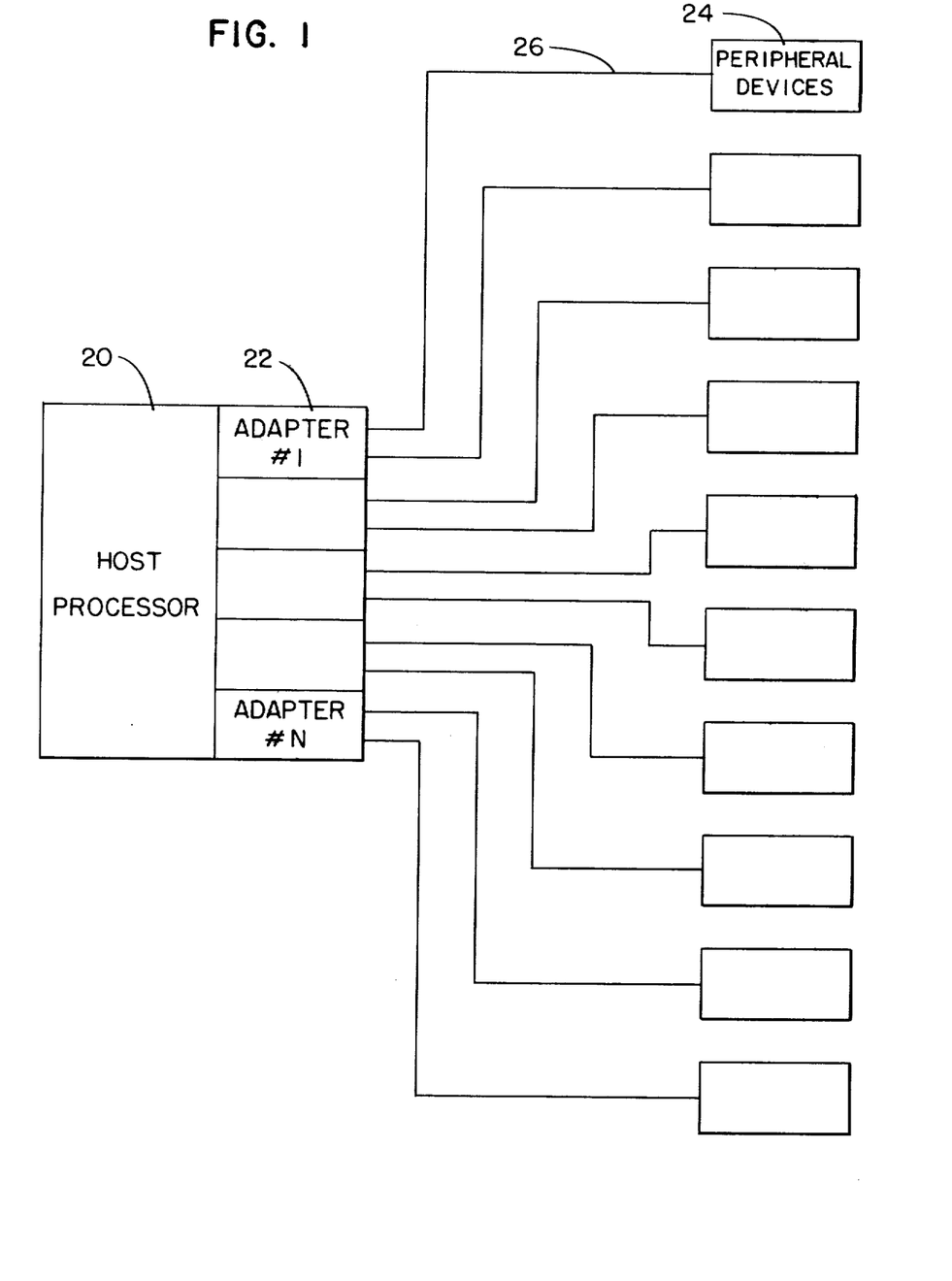
FIG. 1 is a simplified block diagram of a data processing system in which each of the adapters is constructed in accordance with the principles of the present invention.

Referring now to FIG. 1, there is shown a data processing system which comprises a host processor 20 and N number of adapters 22 each connected to a predetermined number of peripheral devices 24 over lines 26. The lines 26 may, for purposes of illustration, be of common bus construction. The adaptor 22 which may be characterized for purposes of this description as a communication adapter may, in the present embodiment, handle up to 16 peripheral devices 24. As will be described more fully hereinafter, the adapter 22 is constructed so that it may communicate with any of the connected peripheral devices 24 independently of the host processor 20.

Figure 2:
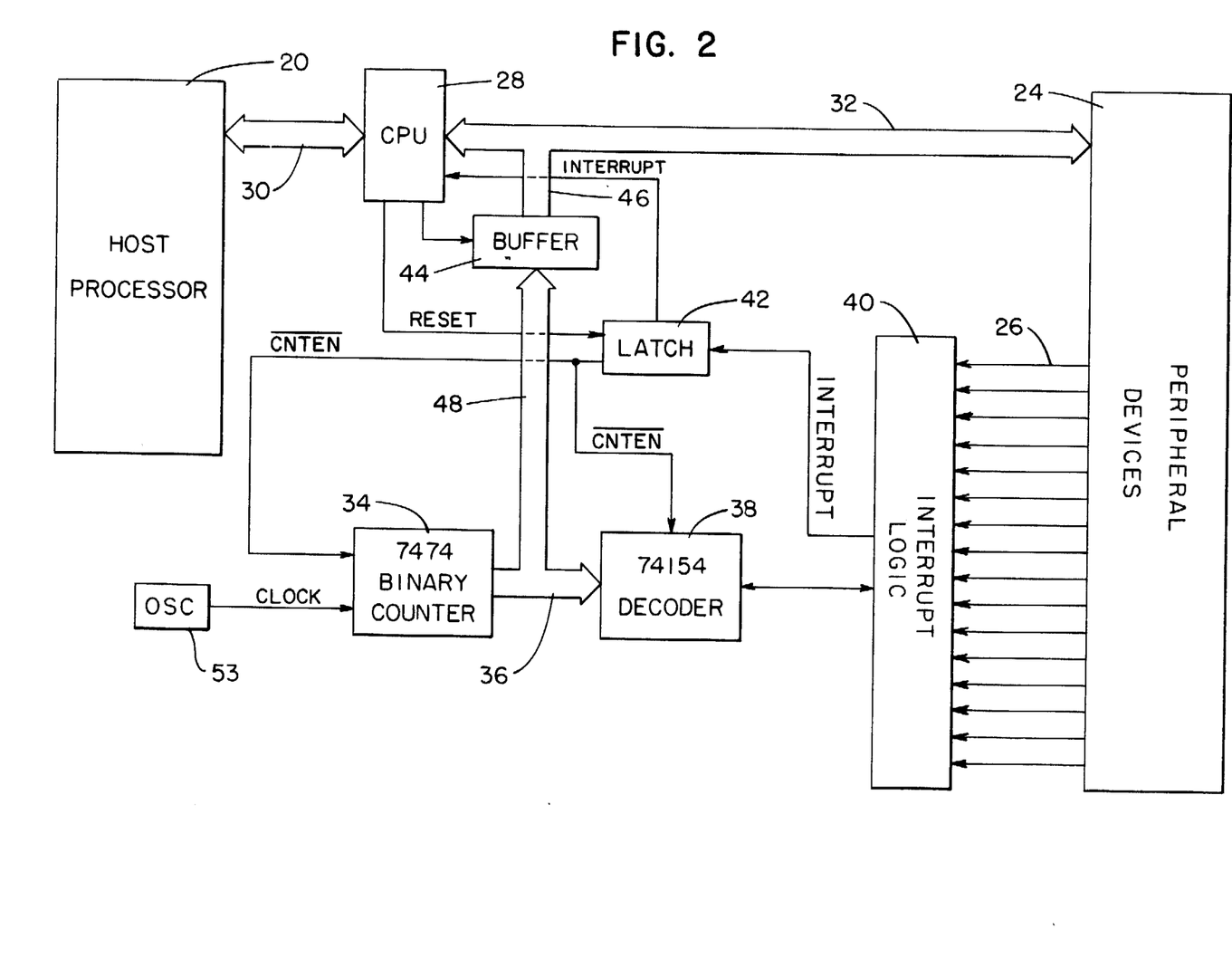
FIG. 2 is a block diagram of the adapter constructed in accordance with the present invention.

As shown in FIG. 2, the adapter 22 includes a microprocessor (CPU) 28 which may in the present embodiment, be an Intel 8080 microprocessor, communicating over bus 30 to the host processor 20 and to the peripheral devices 24 over bus 32, a binary counter 34 for outputting over bus 36 a count which constitutes the address of one of the peripheral devices 24, a decoder 38 for outputting a control signal in accordance with the count output of the counter 34 received over the common communication bus 36, and interrupt logic 40 for selecting the peripheral device 24 which is generating a request message for the host processor 20. The logic 40 generates an INTERRUPT signal in response to the sensing of a requesting peripheral device 24, which INTERRUPT signal sets a latch 42. Setting of the latch 42 outputs a signal INTERRUPT for transmission to the CPU 28 notifying the CPU that one of the peripheral devices 24 has a message for the host processor 20. The CPU 28, upon receiving the signal INTERRUPT, will enable the content of a buffer 44 to be transmitted to the CPU 28 over bus 46. The buffer 44 will have stored therein the output of the counter 34 which output has been transferred to the buffer 44 over bus 48. Using the output of the counter 34 as the address of the requesting peripheral device 24, the CPU 28 will select the port on which the requesting peripheral device is connected and initiate a read operation, the data from the requesting peripheral device being transmitted to the CPU 28 over bus 32. The CPU 28 then causes the outputting of a signal RESET to the latch 42 upon initiating the read operation which results in the resetting of the latch 42, thereby enabling the counter 34 and the decoder 38 to resume operation. The counter 34 will continue its count, the output of which is used for interrogating the remaining remote peripheral devices 24 to select the next requesting peripheral device which has a message for the host processor 20 over lines 26 to the interrupt logic 40. The CPU 28 will store the data received over bus 32 from the requesting peripheral device 24 and raise an interrupt signal over bus 30 to the host processor 20 preparatory for transmission of the stored data to the processor 20.

Figure 3A:
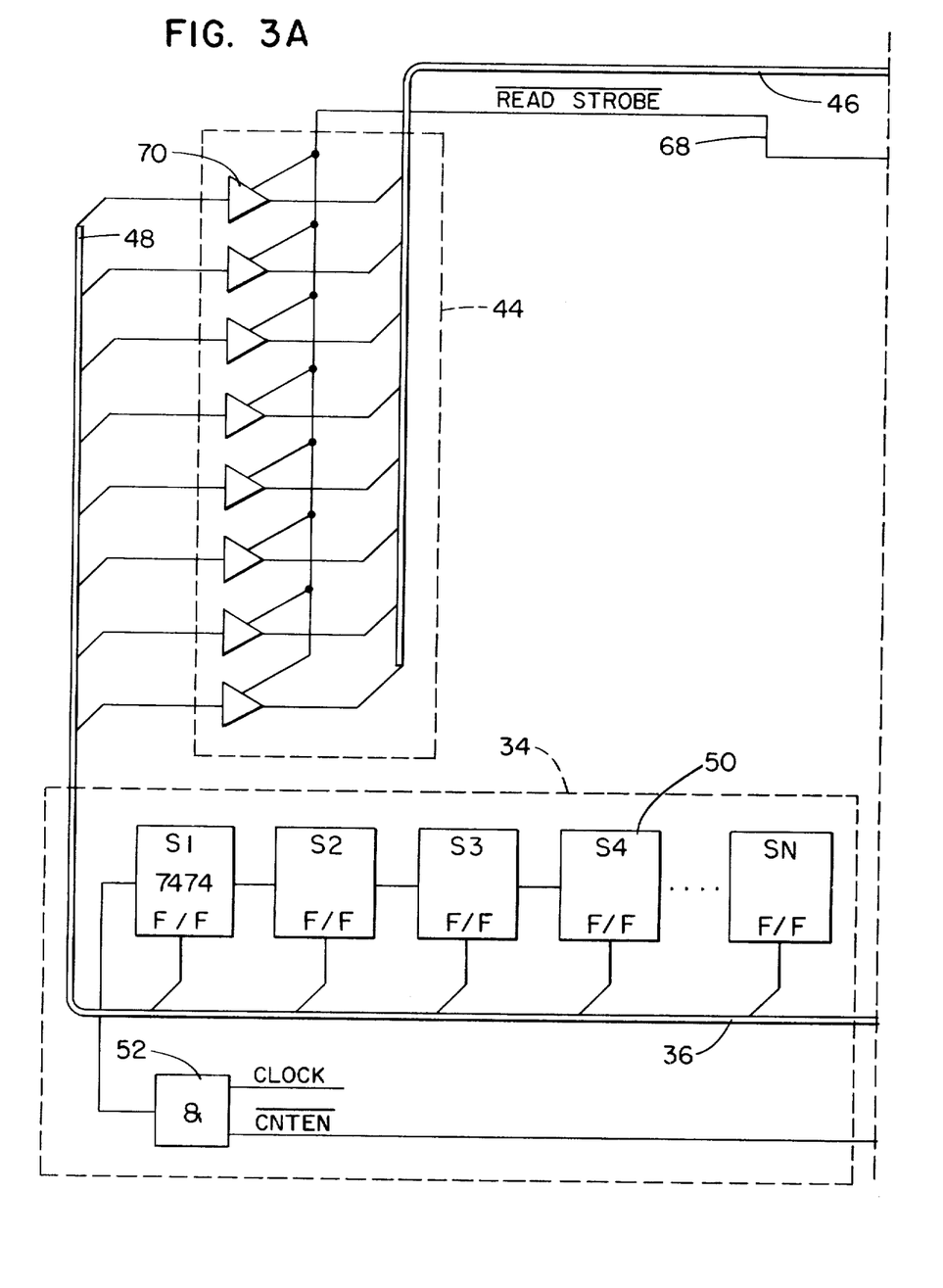
FIGS. 3A and 3B taken together show a detailed block diagram of the adapter of the present invention.
Figure 3B:
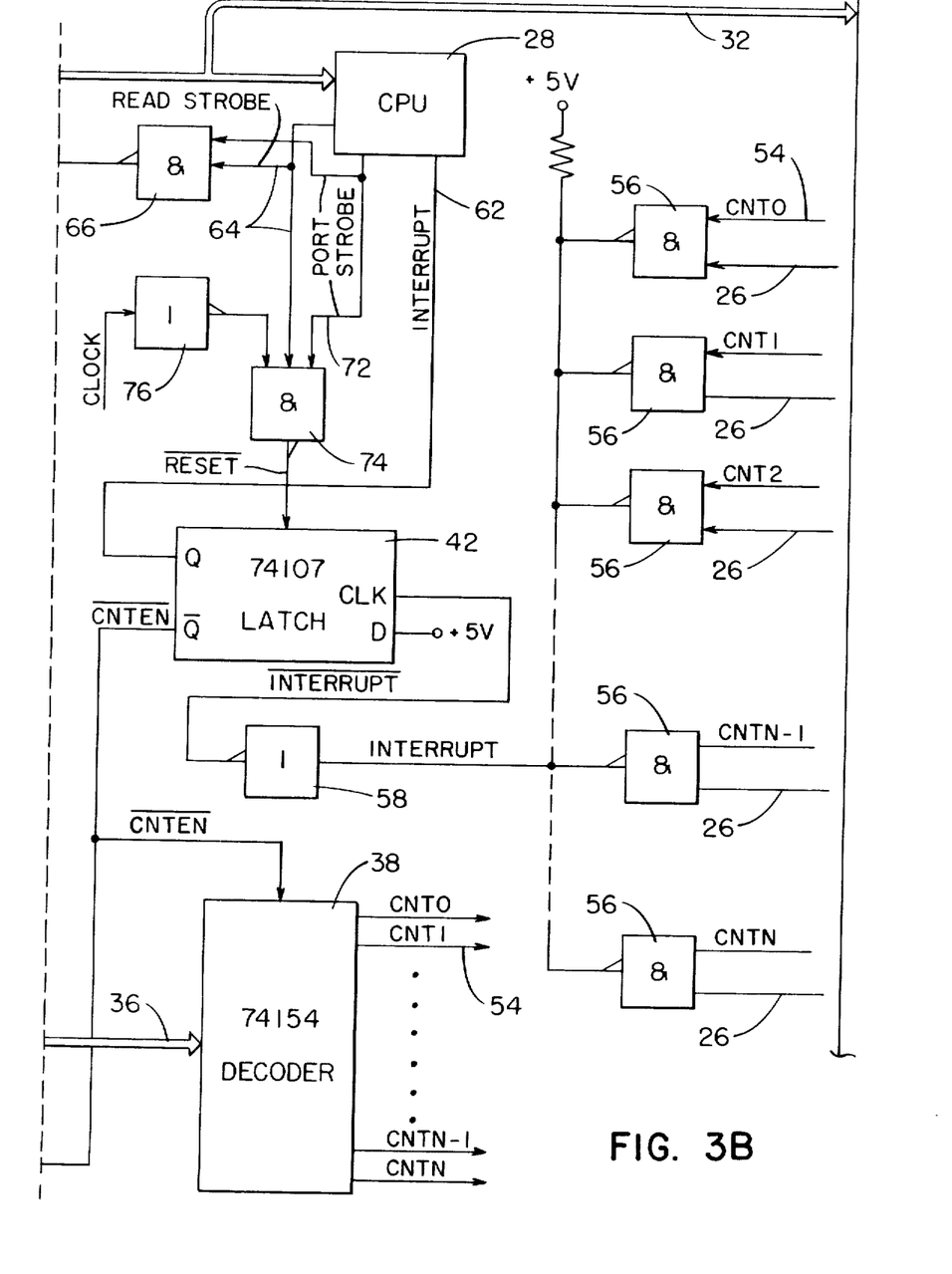
Figure 4:
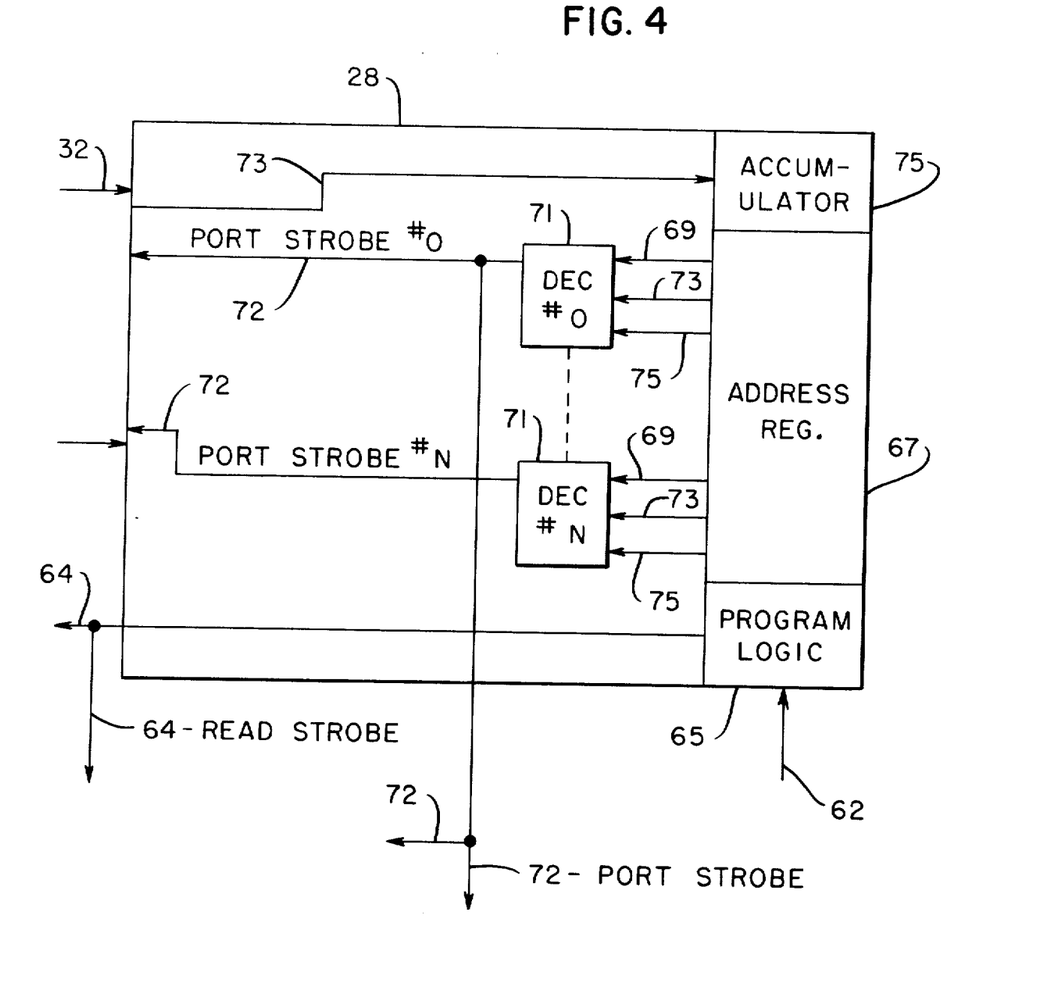
FIG. 4 is a block diagram of a portion of the microprocessor constructed in accordance with the present invention.

Referring now to FIGS. 3A and 3B taken together and FIG. 4, there is shown a detailed block diagram of the adapter shown in FIG. 2. The binary counter 34 (FIG. 3A) is composed of N stages of J-K flip-flops 50 arranged in a conventional manner, the counter being incremented by a clock signal gated by an AND gate 52 from an oscillator 53 (FIG. 2) which, in the present embodiment, has a cyclic rate of 2 mhz. The AND gate 52 is enabled to gate the clock pulses by a control signal $\overline{\text{CNTEN}}$ outputted from the latch 42 (FIG. 3B) which is high at this time. The flip-flops 50 are comprised of SN 7474 integrated circuits manufactured by Texas Instruments, Inc. and disclosed in TTL Data Book for Design Engineers (second edition, 1976) on page 5-22. The number of stages required for the counter 34 are determined by the number of remote peripheral devices 24 that are connected to the adapter 22. In the present embodiment, there are 16 peripheral devices associated with each adapter. With this number of peripheral devices, a four-stage binary counter will output a four bit count up to and including 16.

Each four bit count outputted by the counter 34 will be used as the address of one of the peripheral devices 24. Each count of the counter 34 is outputted over bus 36 to a decoder 38 (FIG. 3B) which will sequentially output high signals CNT0-N corresponding to the output count of the counter 34 over lines 54 to the input of a corresponding NAND gate 56 whose other input is connected over line 26 to one of the remote peripheral devices 24 whose address is the four bit count outputted by the counter 34. It will be seen that the output count of the counter 34 interrogates each of the remote peripheral devices 24 to see if it has a message for the host processor 20. When a peripheral device 24 has a message for the host processor 20, it will raise the line 26 to output a high pulse to its associated NAND gate 56 enabling the NAND gate to gate the pulse received from the decoder 38. The decoder 38 comprises Ser. No. 74154 integrated circuits manufactured by Texas Instruments, Inc. and disclosed in TTL Data Book for Design Engineers (second edition, 1976) on page 7-171. The output signal INTERRUPT of the enabled NAND gate 56 will be inverted by an inverter 58 whose output signal $\overline{\text{INTERRUPT}}$ is transmitted to the set input of the latch 42 setting the latch.

The setting of the latch 42 results in the output pulse $\overline{\text{CNTEN}}$ going low thereby disabling the AND gate 52 and the operation of the counter 34. The output count of the counter 34 at the time of the disabling of the AND gate 52 will be the address of the peripheral device 24 which raised the line 26 to its associated NAND gate 56 (FIG. 3B). The setting of the latch 42 also results in the output pulse INTERRUPT going high which is transmitted over line 62 to the CPU 28 notifying the CPU of the interrupt condition of the system.

The INTERRUPT signal transmitted over line 62 will be inputted into a program logic control portion 63 (FIG. 4) of the microprocessor 28 which will initiate an interrupt service routine which includes outputting a high pulse READ STROBE over line 64 to one input of a NAND gate 66 (FIG. 3B). The interrupt service routine will also output the address of each peripheral device 24 from an address register 67 over line 69 to an associate decoder 71, there being one decoder 71 for each peripheral device. Also outputted to each decoder 71 over line 73 will be the pulse READ STROBE together with a sync pulse over line 75 resulting in the outputting by the decoder 71 of a pulse PORT STROBE over line 72 which is transmitted over bus 32 to each peripheral device 24 alerting the peripheral device of a read operation.

The pulse PORT STROBE is also transmitted over line 72 to the NAND gate 66 (FIG. 3B) enabling the gate whose output pulse $\overline{\text{READ STROBE}}$ is transmitted to the buffer 44 over line 68 (FIG. 3A). The buffer 44 is composed of a plurality of tri-state gates 70 each connected to the output of one of the stages 50 of the counter 34 over bus 48. It will be seen that the N bit count output of the counter 34 will always be present on the inputs of the gates 70. The gates 70 comprise an 8T 97 integrated circuitry manufactured by Signetics. The outputting of the pulse $\overline{\text{READ STROBE}}$ enables the gates 70 to transmit the output count of the counter 34 over buses 46 and 32 to the CPU 28 which utilizes the N bit count to address the port to which the requesting peripheral device 24 is connected which allows the CPU to provide a read operation in a manner that will now be explained.

The count outputted from the buffer 44 is transmitted over bus 32 (FIG. 4) and over line 73 to an accumulator 75 located in the microprocessor 28, which count is then transferred to the address register 67 and out over line 69 to each of the decoders 71. Since only one decoder 71 will recognize the address, that docoder will output a second PORT STROBE over line 72 to the requesting peripheral device 24 resulting in the data being transferred from the requesting peripheral device over bus 32 for storage in the microprocessor 28. The outputting of the first PORT STROBE over line 72 is also transmitted over the bus 30 (FIG. 2) to the host processor 20, which pulse will function as an interrupt signal to the host processor. Upon acknowledgement by the host processor 20, the microprocessor 28 will transmit the stored data received from the requesting peripheral device 24 to the host processor 20.

The outputting of the first high pulse PORT STROBE over line 72 results in the pulse being inputted to one input of a NAND gate 74 which also receives the pulse READ STROBE over line 64 from the CPU 28 and clock pulses gated through an inverter 76 from the oscillator 53 (FIG. 2). Upon receiving a high clock pulse in addition to the pulses READ STROBE and PORT STROBE from the CPU 28, the NAND gate 74 will output a low pulse $\overline{\text{RESET}}$ to the latch 42 resetting the latch resulting in the output pulse INTERRUPT of the latch going low and the output pulse $\overline{\text{CNTEN}}$ going high enabling the counter 34 to continue its count until the next requesting peripheral device is selected in accordance with the procedure just described. If the CPU 28 is still in a read mode when the system detects the next requesting device 24, the CPU 28 will go into an alternate read mode alternately reading both requesting devices. The Intel 8080 system speed is sufficient to read up to four (4) peripheral devices in this mode.

Figure 5:
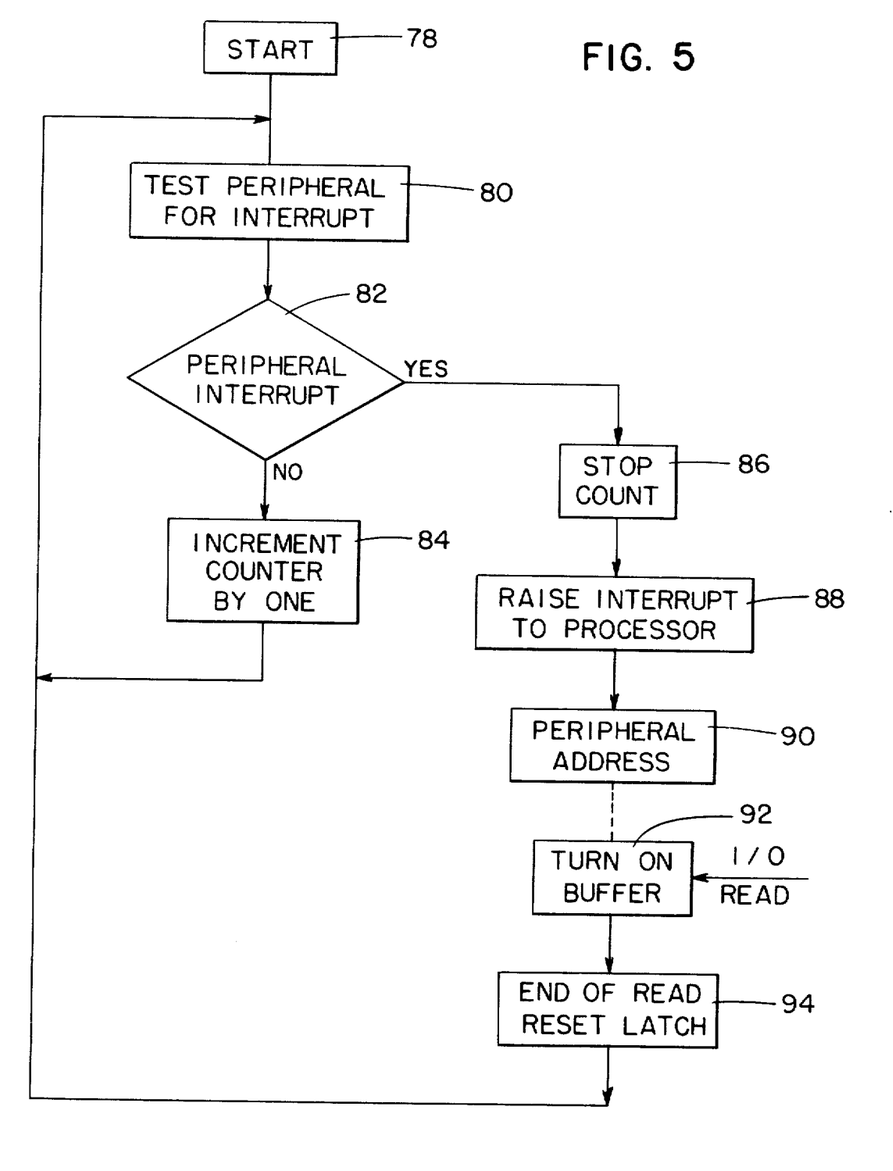
FIG. 5 is a flow chart of the operation of the adapter in processing an interrupt message from a remote peripheral device.

Referring now to FIG. 5, there is disclosed a flow chart of the operation of the adapter 22. At the start (block 78) of the operation, the output count of the counter 34 (FIGS. 2 and 3A) will be at zero. The counter 34 will be incremented by the clock pulses gated by the AND gate 52 to output in sequence a N bit count in a manner that is well known in the art. The output of the counter 34 is transmitted to the decoder 38 (FIGS. 2 and 3B) which will interrogate (block 80) each of the remote peripheral devices 24 by transmitting one of the control signals CNT0-N over line 54 to the appropriate NAND gate 56 whose other input is connected over line 26 to one of the remote peripheral devices 24. If after counting through each of the remote peripheral devices without generating an interrupt signal to the latch 42, the counter 34 will repeat its counting procedure until a line 26 is raised by one of the peripheral devices indicating a message request for the host processor 20. The raising of the signal INTERRUPT sets the latch 42 which will disable the operation of the counter 34 (block 86), and also raise the signal INTERRUPT to the CPU 28 (block 88). As a result of receiving the signal INTERRUPT, the CPU 28 will output the signals READ STROBE and PORT STROBE (block 90) enabling the buffer 44 (block 92) to output over bus 46 to the CPU 28 the output count of the counter 34 which is the address of the requesting remote peripheral device 24. Using the N bit count, the CPU 28 will select the appropriate port to which the requesting peripheral device is connected for reading the data transmitted over the bus 32 to the CPU 28. During the selecting of the port, the CPU 28 will output the signal PORT STROBE to the NAND gate 74 which resets the latch 42 thereby enabling the counter 34 to continue its count in order to interrogate the remainder of the remote peripheral devices 24 for selecting the next requesting peripheral device.

Figure 6:
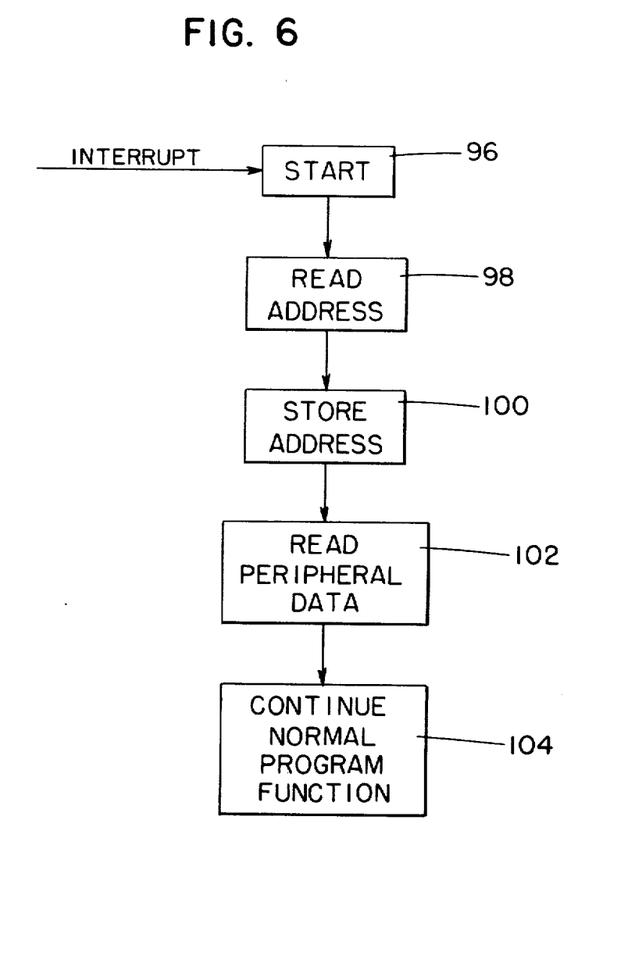
FIG. 6 is a flow chart of the operation of the microprocessor in response to receiving an interrupt signal.

Referring now to FIG. 6, there is disclosed a flow chart of the operation of the CPU 28 upon receiving the pulse INTERRUPT as a result of the setting of the latch 42. At the start of the interrupt operation (block 96), the CPU 28 may be operating within a program mode which is not concerned with an interrupt condition. As soon as the CPU 28 receives the pulse INTERRUPT, it will output the high signals READ STROBE and PORT STROBE resulting in the output count of the counter 34 being transmitted to the CPU 28 over the buses 46 and 32 (block 98). The CPU 28 will then store the N bit count in the address register 67, FIG. 4, (block 100) located in the CPU, which is then used to select the port associated with the peripheral device 24 whose address is the count stored in the address register (block 100). The CPU 28 will then read the data transmitted over bus 32 from the requesting peripheral device for storage in a data register (not shown) (block 102) located in the CPU. The CPU 28 will have by this time outputted over bus 30 (FIG. 2) to the host processor 20 a signal PORT STROBE indicating that the microprocessor 28 has data ready to be transmitted to the host processor 20. The outputting of high signal PORT STROBE by the microprocessor 28 will enable the NAND gate 74 which resets the latch 42 thereby enabling the counter 34 to continue its count. The CPU 28 will then continue normal program operations (block 104) until the next signal INTERRUPT is received over line 62 at which time the CPU will then go into another interrupt service routine.

It will be seen that the interrupt system of the present invention operates completely independent of the CPU 28 and the host processor 20 until the time the CPU 28 is required to read the data from the requesting peripheral device 24. Since the address of the requesting peripheral device is always at an input to the CPU, the CPU is not required to provide any type of a polling sequence or a table lookup operation to determine the address of the requesting peripheral device. This arrangement provides a very fast interrupt operation while keeping the overall cost of the adapter to a very low level.

While the invention has been particularly shown and described with reference to a preferred embodiment thereof, it will be understood by those skilled in the art that various changes in forms and details may be made therein without departing from the spirit and scope of the invention. Hence, applicants desire their invention to be not limited beyond the scope as required by the appended claims.

What is claimed is:

1. In a data processing system having a central processor and a plurality of data terminal devices each having a request line for signalling the central processor to request exchange of information comprising,
   an interface device coupled to said central processor over a communication line;
   a microprocessor located on said interface device;
   first gating means connected in series to each request line of said data terminal devices for outputting an exchange request signal found on its associated request line when enabled;
   means for generating timing pulses
   binary counter means responsive to said timing pulses for generating a plurality of binary counts each representing the address of one of said remote terminal devices;
   decoder means coupled to the output of said binary counter means to output a control signal in response to the generation of each of said binary counts, said decoded means coupled to each of said first gating means to output said control signal to the first gating means whose associated request line is connected to the terminal device having the address which generated the control signal for enabling said first gating means to output an exchange request signal when there is a request signal on the request line;
   storage means responsive to the outputting of said control signal to store the binary count generated by said counter means, said storing means connected to said microprocessor;

disabling means responsive to the outputting of said exchange request signal for disabling said counter means and operating said storing means to transfer the binary count stored therein to the microprocessor;

and means responsive to the transfer of the binary count to the microprocessor to initiate the transfer of information from the requesting terminal device to the microprocessor for storage therein.

2. The system of claim 1 in which said disabling means includes;

a latch member connected to each of said first gating means and set in response to the outputting of said exchange request signal for disabling said counter means and generating an interrupt signal;

and said microprocessor includes means responsive to the generation of said interrupt signal for enabling said storing means to transfer the binary count stored in said storing means to said microprocessor to enable the microprocessor to transfer data from the data terminal device whose address was represented by the binary count stored in said storing means.

3. The system of claim 2 in which said storing means comprises a tri-state buffer connected to the output of said binary counter means for storing each binary count upon the generation of the binary count by the counter means, said buffer enabled in response to the generation of said interrupt signal to transfer the address stored therein to the microprocessor.

4. The system of claim 2 in which said microprocessor further includes means responsive to the generation of said interrupt signal for transferring data from the data terminal device whose address corresponds to the binary count stored in said storing means to the microprocessor, said system further including second gating means operated in response to the enabling of the storing means and the transferring of data from the data terminal device for resetting said latch member whereby the binary counter means resumes outputting in sequential order the binary counts representing the addresses of the data terminal devices.

5. The system of claim 4 in which said storing means is external to said microprocessor.

* * * * *